(12) United States Patent
Engsl et al.

(10) Patent No.: US 8,623,316 B2
(45) Date of Patent: Jan. 7, 2014

(54) COMBINED SOLID WASTE, CARBON DIOXIDE QUICKLIME SPARGING, BRINE WATER, AND REVERSE OSMOSIS/ION EXCHANGE PROCESSES FOR THE PRODUCTION OF SODA CHEMICALS

(76) Inventors: Fze Engsl, Abu Dhabi (AE); Tarek R. Farhat, Memphis, TN (US)

( * ) Notice: Subject to any disclaimer, the term of this patent is extended or adjusted under 35 U.S.C. 154(b) by 242 days.

(21) Appl. No.: 13/127,873

(22) PCT Filed: Jul. 23, 2008

(86) PCT No.: PCT/IB2008/002020
§ 371 (c)(1),
(2), (4) Date: May 5, 2011

(87) PCT Pub. No.: WO2010/010417
PCT Pub. Date: Jan. 28, 2010

(65) Prior Publication Data
US 2011/0217227 A1    Sep. 8, 2011

(51) Int. Cl.
*C01D 7/12*     (2006.01)
*C01D 7/00*     (2006.01)

(52) U.S. Cl.
USPC ..................... 423/424; 423/422; 423/427

(58) Field of Classification Search
USPC ........................... 423/419.1–437.2
See application file for complete search history.

(56) References Cited

U.S. PATENT DOCUMENTS

2010/0282614 A1*   11/2010   Detournay et al. .......... 205/439

* cited by examiner

*Primary Examiner* — Daniel C McCracken
(74) *Attorney, Agent, or Firm* — Locke Lord LLP

(57) ABSTRACT

The proposed invention uses a classical chemical equation where carbon dioxide $CO_2$ is reacted with quick lime $Ca(OH)_2$ to produce soda carb $NaHCO_3$ and concentrating it to 6% using advanced membrane and resin technology. The invention requires three chemicals $CO_2$, $Ca(OH)_2$, and sodium chloride NaCl to produce $NaHCO_3$. The output of many industrial processes lacks waste heat and in many instances $CO_2$ and the present invention combines a solid waste processing unit to the above processes which allows the production of solid products or high % liquors. Availability of waste heat sources can lead to high efficiency in $NaHCO_3$, $Na_2CO_3$, and NaOH production. The process is not chloro-alkali electrochemical or Solvay column ammonia processing technique. Advanced membrane uses technologies of reverse osmosis and nanofiltration systems while resin technology uses ion exchange systems. Therefore, we conveniently call it the solid waste-quicklime membrane SWQM process.

17 Claims, 4 Drawing Sheets

COMBINED SOLID WASTE, CARBON DIOXIDE QUICKLIME SPARGING, BRINE WATER, AND REVERSE OSMOSIS/ION EXCHANGE PROCESSES FOR THE PRODUCTION OF SODA CHEMICALS

This application is a national phase entry under 35 U.S.C. §371 of International Application Number PCT/IB2008/002020, filed on Jul. 23, 2008, entitled "A COMBINED SOLID WASTE, CARBON DIOXIDE QUICKLIME SPARGING, BRING WATER, AND REVERSE OSMOSIS/ION EXCHANGE PROCESSES FOR THE PRODUCTION OF SODA CHEMICALS, of which is hereby incorporated by reference.

TECHNICAL FIELD AND BACKGROUND INFORMATION

Using brine water and advanced membrane and resin technology in solid waste processing and the production of soda carb $NaHCO_3$.

The present invention uses a classical equation where $CO_2$ is reacted with quicklime Ca(OH)2 to produce clear solution of calcium bicarbonate $Ca(HCO_3)_2$ such that:

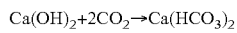

$$Ca(OH)_2 + 2CO_2 \rightarrow Ca(HCO_3)_2$$

Calcium bicarbonate (500 to 1000 ppm) is then processed by a cation exchange system to produce soda carb (500 to 1000 ppm) such that:

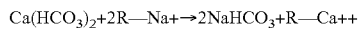

$$Ca(HCO_3)_2 + 2R\text{---}Na+ \rightarrow 2NaHCO_3 + R\text{---}Ca++$$

Presence of brine water with a salinity of 8 to 12% is crucial because it is used to regenerate the cation exchanger such that:

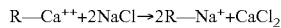

$$R\text{---}Ca^{++} + 2NaCl \rightarrow 2R\text{---}Na^+ + CaCl_2$$

Soda carb liquor produced is of low percentage, i.e., 0.05 to 0.1% and need to be concentrated to ~6%. The concentration process is performed using reverse osmosis system where the soda carb liquor is taken through multiple passes until the final concentrate output is around 6%.

Industrially a concentration of 6% is low to extract the solid economically a major setback for membrane technology. The difficulty in going above 6% with membrane technology is the high pressure that deteriorates the membrane. Even if recompression evaporation is used around 1MW is required to produce one ton of solid product. In the present invention the most obvious heat source is the heat emitted by solid waste incineration.

SUMMARY

Solid waste, brine water waste, and $CO_2$ waste are major problems faced by human communities worldwide. The proposed invention attempts to bring these three waste problems in one industrial process to bring about a green solution while making a financial benefit The green solution is fulfilled by large elimination of the various wastes stated above. The financial benefit comes from selling the soda commodity chemicals as byproduct of the combined processes. In a sense the SWQM process is an alternative to the classical Solvay process that is used worldwide to produce soda carb $NaHCO_3$ and soda ash $Na_2CO_3$. The Solvay process uses poisonous ammonia gas with a complex column system to extract the said products. In the Solvay process mined calcium carbonate is heated in a kiln at 12000 C. for conversion into lime stone CaO and $CO_2$. From lime stone CaO quicklime $Ca(OH)_2$ is produced while $CO_2$ is used in the production of soda carb $NaHCO_3$. The SWQM process is very different in that it does not use ammonia gas and substitutes the quicklime RONFIE system [separate patent] instead of the complex column system. In a Solvay process $CO_2$ has to be pure and released from $CaCO_3$ kilns in order to react it with ammonia gas and brine solution under precise conditions of the Solvay column. The SWQM process requires a sparging reactor to bubble flue gas, which contain $CO_2$, from a nearby industry or solid waste plant. It does not mean that $CaCO_3$ kilns cannot be used if the heat from incinerators can be harnessed to convert $CaCO_3$ to CaO. Magnitude of heat released from incinerators depends on the quantity of carbon based material CBM (i.e. paper, cardboard, wood, plastics, rubber, . . . etc.) present at a dump site. The greater is the availability of CBM more chemical or physical processes can be performed to make SWQM a self contained process.

BRIEF DESCRIPTION OF THE DRAWINGS

Figure 3:
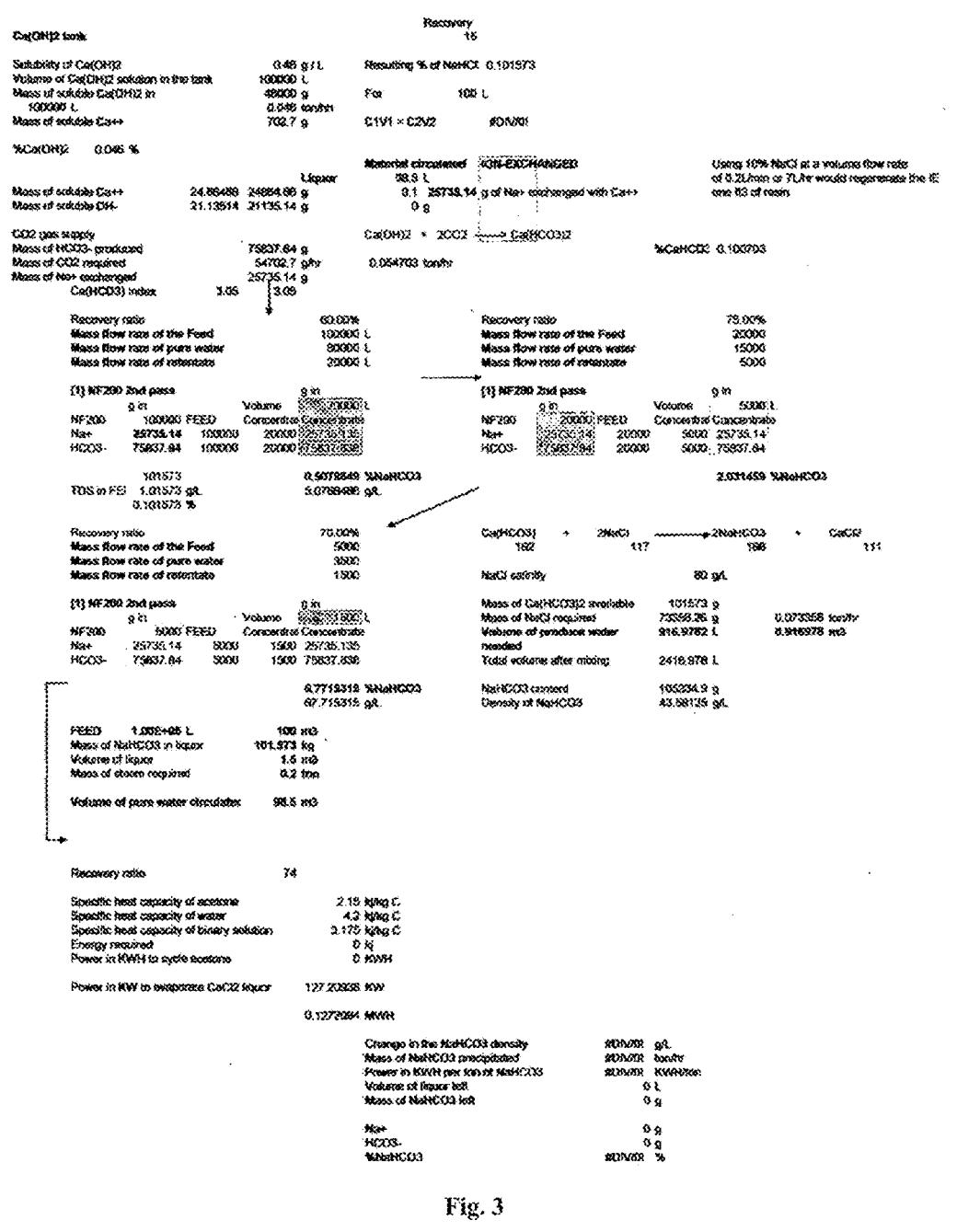

FIG. 3 is schematics of sodium bicarbonate production unit using $Ca(OH)_2$ reverse osmosis and ion exchange process.

FIG. 4 is schematics of sodium bicarbonate production unit using $Ca(OH)_2$ reverse osmosis process.

DETAILED DESCRIPTION

Figure 1:
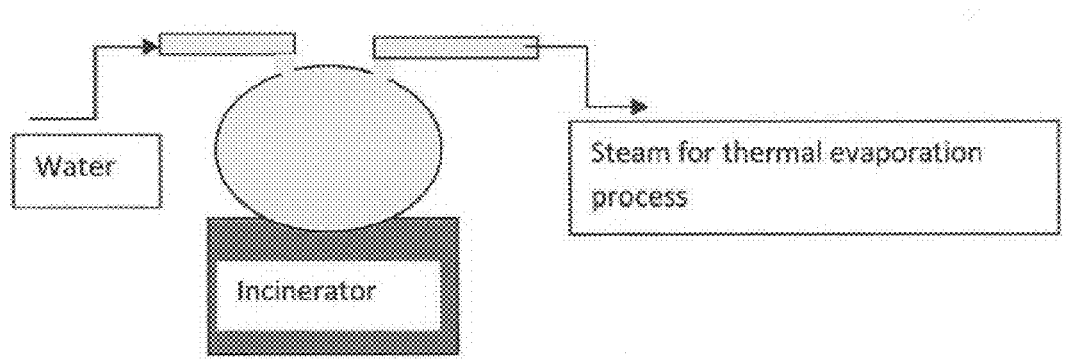
FIG. 1 is a schematic for a solid waste steam production unit.

The process by which a classical chemical equation is used, where carbon dioxide $CO_2$ is reacted with quick lime $Ca(OH)_2$ to produce soda carb $NaHCO_3$ and concentrating it to 6% using advanced membrane and resin technology. The invention requires three chemicals $CO_2$, $Ca(OH)_2$, and sodium chloride NaCl to produce $NaHCO_3$. The output of many industrial processes lacks waste heat and in many instances $CO_2$ and the present invention combines a solid waste processing unit to the above processes which allows the production of solid products or high % liquors. Availability of waste heat sources can lead to high efficiency in $NaHCO_3$, $Na_2CO_3$, and NaOH production. The process is not chloroalkali electrochemical or Solvay column ammonia processing technique. Advanced membrane uses technologies of reverse osmosis and nanofiltration systems while resin technology uses ion exchange systems. Therefore, we conveniently call it the solid waste-quicklime membrane SWQM process. The SWQM process which does not use ammonia gas, substitutes the quicklime RONFIE system with the complex column system. The SWQM process requires a sparging reactor to bubble flue gas, which contain $CO_2$, from a nearby industry or solid waste plant. A typical schematic for a solid waste steam production unit is shown in FIG. 1.

Specifically, heat from solid waste incineration can do the following:

1—Heat can boil sea water to produce brine water ranging from 6 to 10% and steam. The same brine water can be used in soda 6% solution generation while the steam is used for concentration or drying. From this point, the present invention can be dedicated to solid waste processing only where the products obtained are potable water and commodity soda chemicals.

2—Heat can boil natural water for steam generation and the steam is used for concentration or drying. Note: One ton of steam at ~150° C. boils off 10 ton of water.

Figure 2:
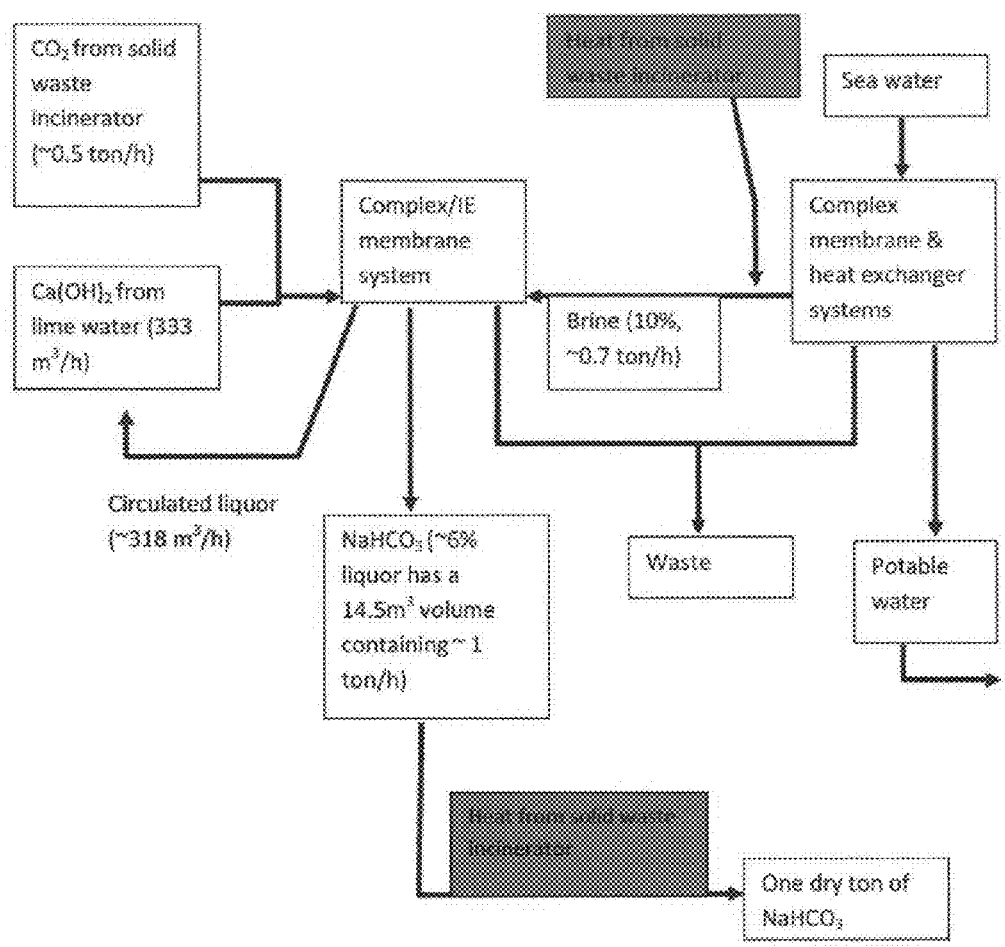
FIG. 2 is a schematic of a solid waste incinerator.

As indicated in point (1) above large scale solid waste incineration can be harnessed to generate $CO_2$, brine water, and heat for the SWQM process as illustrated in FIG. 2.

The process essentially relies on advanced membrane technology systems to produce sodium bicarbonate $NaHCO_3$. Therefore, it is very different from classical Solvay process that uses ammonia gas to do the conversion. The schematic shown below depicts the various stages in the process:

Reactor design: Carbon dioxide gas is sparged through quick limewater $Ca(OH)_2$ in a reactor to form calcium hydrogen carbonate $Ca(HCO_3)_2$ liquor. The latter is then subjected to further filtration to remove impurity particulates then passed to a complex membrane system.

Complex membrane system: The low % liquor gets converted and concentrated to 7% sodium hydrogen carbonate liquor. Complex membrane system operate as follows:

1—An ion exchange(IE)/reverse osmosis (RO) system: where ion exchange unit transforms the $Ca(HCO_3)_2$ liquor to $NaHCO_3$ liquor. Multiple RO cartridges are cascaded to concentrate die sodium hydrogen carbonate liquor from ~0.1% to ~7%. A detailed mass balance analysis of the entire process is illustrated in FIG. 3.

Figure 4:
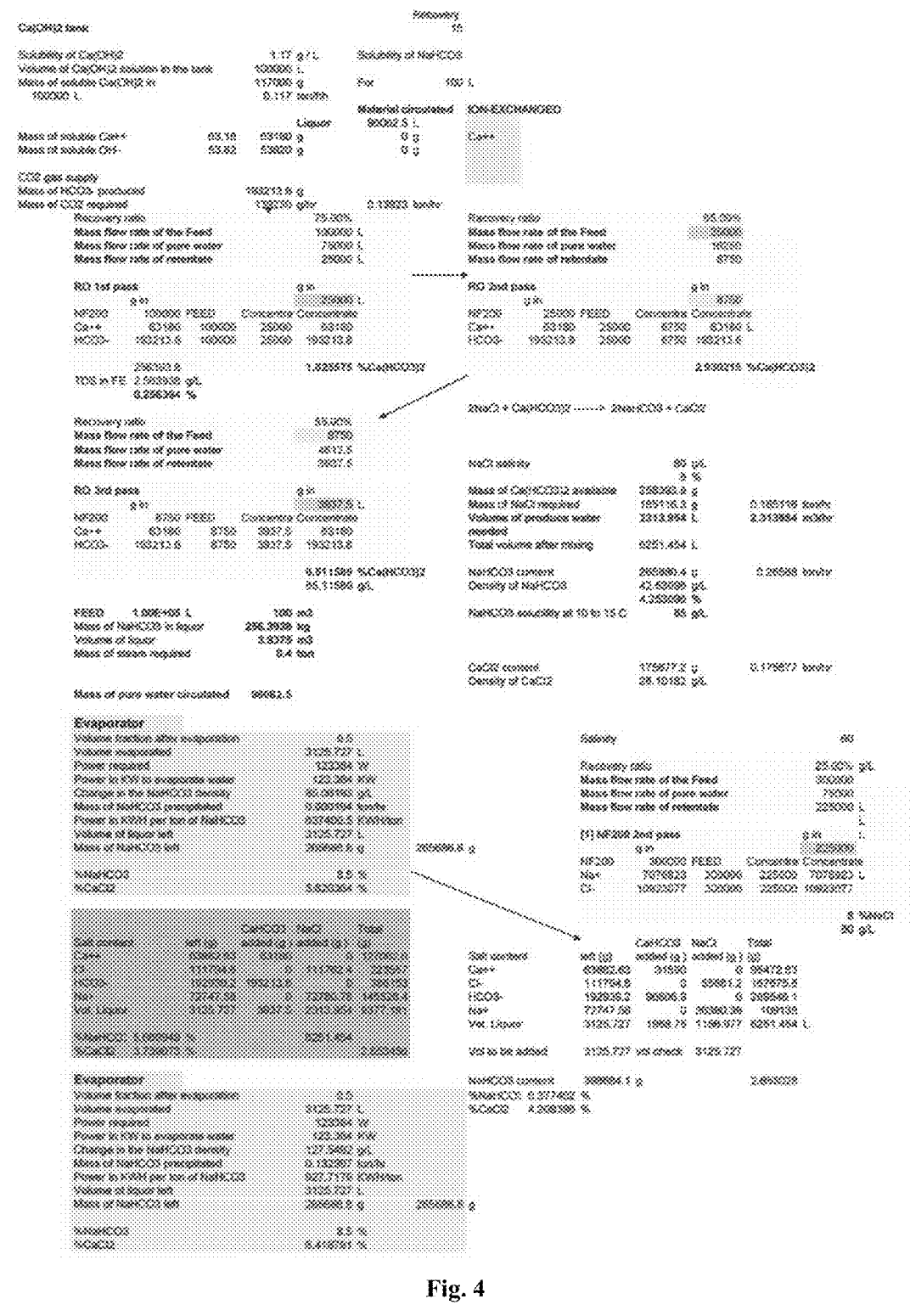

2—A reverse osmosis (RO) unit where three RO cartridges are cascaded to concentrate the calcium hydrogen carbonate liquor from −0.25% to ~8%. The RO unit is followed by a reactor mixer where ~8% $Ca(HCO_3)_2$ is mixed with 8 to 10% NaCl to initiate the precipitation of $NaHCO_3$ where part of the solution is boiled to concentrate the liquor. A detailed mass balance analysis of the entire process is illustrated in FIG. 4.

Waste heat that is provided by the solid waste processing unit can convert water into steam of 120 to 150° C. having a boiler above the solid waste incinerator. The steam can be used to convert the 7% sodium hydrogen carbonate liquor to dry sodium hydrogen carbonate by evaporating half the volume. If waste heat is above 220° C. then the 7% sodium hydrogen carbonate liquor can be dried and converted to soda ash $Na_2CO_3$.

Ion exchangers mat are used in this process are regenerated from either processed seawater or produced brine water. In the above schematic, if brine water concentration C is >10% salinity men the complex membrane and heat exchanger system is not needed. If brine water concentration 6%<C<9% salinity then the complex membrane is not needed and the heat exchanger system can be used to raise its concentration to 10% or if it is cheaper NaCl is added to bring C up to 10%. If only seawater is available then the complex membrane and heat exchanger system is used to isolate and increase concentration from 3.5% to 10% saline NaCl.

One important aspect about this process is the circulation of RO permeate which save on pure water production and chemicals supply. There are waste products such as calcium chloride and magnesium chloride that can be diluted with the pure water produced from the complex membrane and heat exchanger system and returned back to the sea without harming the marine environment. The net production of potable water is difficult to estimate at this stage and depends on the government tolerance level of $Ca^{++}$, $Mg^{++}$ salts after dilution.

Examples of Intended Use And Other Methods of Industrial Use

The SWQM process is most convenient for industries that emit brine water (i.e. salinity between 6 to 16%) and lack any waste heat and $CO_2$ sources. However, it can also work on industries that emit a limited amount of $CO_2$ where the combined amounts from an industrial plant and the solid waste plant can be harnessed in $CO_2$ sequestration and soda chemical production. A solid waste process can operate on a large scale where solid waste incineration can be harnessed to generate $CO_2$, brine water, and heat for the SWQM process.

The invention claimed is:

1. A solid waste-quicklime membrane (SWQM) process for production of sodium hydrogen carbonate ($NaHCO_3$), comprising:
    providing a reactor with a quicklime ($Ca(OH)_2$) water;
    sparging carbon dioxide ($CO_2$) through the quicklime ($Ca(OH)_2$) water in the reactor to generate calcium hydrogen carbonate ($Ca(HCO_3)_2$) liquor;
    concentrating the generated calcium hydrogen carbonate ($Ca(HCO_3)_2$) liquor in a reverse osmosis system;
    producing a sodium hydrogen carbonate ($NaHCO_3$) by combining the concentrated calcium hydrogen carbonate ($Ca(HCO_3)_2$) liquor and a brine solution in a mixer.

2. The process of claim 1, further comprising, concentrating the sodium hydrogen carbonate ($NaHCO_3$) to at least 6% by heating the produced sodium hydrogen carbonate ($NaHCO_3$) to remove excess water.

3. The process of claim 1, wherein the reverse osmosis system concentrates the calcium hydrogen carbonate ($Ca(HCO_3)_2$) liquor to between about 6% and about 10%.

4. The process of claim 1, wherein the brine solution has at least 8% NaCl.

5. The process of claim 1, wherein the process obtains sodium hydrogen carbonate ($NaHCO_3$) without using ammonia.

6. The process of claim 1, further comprising subjecting the generated calcium hydrogen carbonate ($Ca(HCO_3)_2$) liquor before the step of concentrating with the reverse osmosis system to a filtration system to remove impurity particulates.

7. The process of claim 1, wherein the carbon dioxide is obtained from burning solid waste.

8. The process of claim 1, wherein the brine and a potable water are obtained from desalinization process.

9. A solid waste-quicklime membrane (SWQM) process for production of sodium hydrogen carbonate ($NaHCO_3$), comprising:
    providing a reactor with a quicklime ($Ca(OH)_2$) water;
    sparging carbon dioxide ($CO_2$) produced as a by-product of a solid waste facility through the quicklime ($Ca(OH)_2$) water in the reactor to generate calcium hydrogen carbonate ($Ca(HCO_3)_2$) liquor;
    concentrating the generated calcium hydrogen carbonate ($Ca(HCO_3)_2$) liquor in a reverse osmosis system to about 6-10%;
    producing a sodium hydrogen carbonate ($NaHCO_3$) by combining the concentrated calcium hydrogen carbonate ($Ca(HCO_3)_2$) liquor and a brine solution that has at least 8% NaCl in a mixer,
    concentrating the sodium hydrogen carbonate ($NaHCO_3$) to at least 6% by heating the produced sodium hydrogen carbonate ($NaHCO_3$) to remove excess water,
    wherein the process obtains sodium hydrogen carbonate ($NaHCO_3$) without using ammonia.

10. A solid waste-quicklime membrane (SWQM) process for production of sodium hydrogen carbonate ($NaHCO_3$), comprising:
    providing a reactor with a quicklime ($Ca(OH)_2$) water;
    sparging carbon dioxide ($CO_2$) through the quicklime ($Ca(OH)_2$) water in the reactor to generate calcium hydrogen carbonate ($Ca(HCO_3)_2$) liquor;
    producing a sodium hydrogen carbonate ($NaHCO_3$) by combining the calcium hydrogen carbonate ($Ca(HCO_3)_2$) liquor and a brine solution in an ion exchange reactor; and concentrating the generated sodium hydrogen carbonate ($NaHCO_3$) liquor in a reverse osmosis system.

11. The process of claim 10, further comprising drying the generated sodium hydrogen carbonate ($NaHCO_3$) liquor in an evaporator reactor to at least 6%.

12. The process of claim 10, wherein the reverse osmosis system concentrates the sodium hydrogen carbonate ($NaHCO_3$) liquor from about 0.25% to about 8%.

13. The process of claim 10, wherein the brine solution has at least 8% NaCl.

14. The process of claim 10, wherein the process obtains sodium hydrogen carbonate ($NaHCO_3$) without using ammonia.

15. A process for utilizing carbon dioxide ($CO_2$) and heat as by-products generated by a solid waste facility, comprising, providing a reactor with a quicklime ($Ca(OH)_2$) water;

sparging carbon dioxide ($CO_2$) generated by the solid waste facility through the quicklime ($Ca(OH)_2$) water in the reactor to generate low concentrated calcium hydrogen carbonate ($Ca(HCO_3)_2$) liquor;

concentrating the low concentrated calcium hydrogen carbonate ($Ca(HCO_3)_2$) liquor in a reverse-osmosis filtration system;

combining the concentrated calcium hydrogen carbonate ($Ca(HCO_3)_2$) liquor with a brine (NaCl) solution in an ion exchange reactor to precipitate sodium hydrogen carbonate ($NaHCO_3$), and concentrating the sodium hydrogen carbonate ($NaHCO_3$) using heat from the solid waste facility to generate dry sodium hydrogen carbonate ($NaHCO_3$) or soda ash ($Na_2CO_3$).

16. The process of claim 15, wherein the brine solution is generated by passing sea water through a complex membrane system, a heat exchanger or a combination thereof.

17. The process of claim 15, further comprising burning a solid waste to generate $CO_2$ and heat.

* * * * *